United States Patent
Benz et al.

[11] Patent Number: 6,110,561
[45] Date of Patent: *Aug. 29, 2000

[54] BREAK-RESISTANT MULTIRIBBED PLATE OF POLYMETHYL METHACRYLATE

[75] Inventors: Volker Benz, Hoechst; Michael Mueller, Bensheim, both of Germany

[73] Assignee: Roehm GmbH Chemische Fabrik, Darmstadt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,248

[22] Filed: Mar. 25, 1996

[30] Foreign Application Priority Data

Mar. 24, 1995 [DE] Germany ............ 295 04 997 U

[51] Int. Cl.[7] ............................................. B32B 3/12
[52] U.S. Cl. ................................ 428/119; 428/188
[58] Field of Search .............................. 428/119, 188

[56] References Cited

U.S. PATENT DOCUMENTS

| | | | |
|---|---|---|---|
| 4,114,597 | 9/1978 | Erb | 126/270 |
| 4,513,048 | 4/1985 | Kaube et al. | 428/188 |
| 4,513,118 | 4/1985 | Suetterlin et al. | 525/81 |
| 4,569,875 | 2/1986 | Pohlman et al. | 428/119 |

FOREIGN PATENT DOCUMENTS

| | | |
|---|---|---|
| 0 105 159 | 4/1984 | European Pat. Off. . |
| 0 118 683 | 9/1984 | European Pat. Off. . |

*Primary Examiner*—Donald R. Wilson
*Attorney, Agent, or Firm*—Oblon, Spivak, McClelland, Maier & Neustadt, P.C.

[57] ABSTRACT

A multiribbed plate of an impact-resistant polymethyl methacrylate SP, wherein the impact-resistant polymethyl methacrylate SP is made of:

p1) 4–30 wt % of an elastomer phase E of crosslinked polymer particles VP, made of 60–99.9 parts by weight alkyl acrylate, aryl acrylate or a mixture thereof, 0.1–10 parts by weight of one or more crosslinking agents, and 0–30 parts by weight of one or more monofunctional ethylenically unsaturated comonomers; and p2) 70–96 wt % of a thermoplastic matrix phase M of polymethyl methacrylate P, containing from 0 to 20 parts by weight, relative to 100 parts by weight P, of units from one or more comonomers, wherein the elastomer phase E and the matrix phase M have refraction indices which are the same or which deviate from one another by a value n, wherein $n \leq 0.02$, and the sum of p1) and p2) is 100 wt %, and wherein the multiribbed plate has specific geometric construction requirements providing high impact-resistance and hail resistance.

11 Claims, 1 Drawing Sheet

BREAK-RESISTANT MULTIRIBBED PLATE OF POLYMETHYL METHACRYLATE

BACKGROUND OF THE INVENTION

1. Field of the Invention

The present invention relates to a break-resistant multiribbed plate of impact-resistant polymethacrylate SP, having high hail resistance.

2. Discussion of the Background

Multiribbed plates made of polymethyl methacrylate plastics are known. Especially for vitrification, multiribbed plates of polymethyl methacrylate plastics are used due to their higher translucence and greater resistance to weathering.

DE-OS 3,011,905 describes window elements of double-ribbed plates which combine translucence and light-reflective properties and have insulating intermediary spaces containing static air in order to delay transfer of heat through the window elements. The disclosed ribs in the double-ribbed plates are arranged geometrically and vary in their translucencies such that the intensity of the solar radiation after penetration through the window elements varies as a function of the height of the sun. The window elements are preferably made of acrylic polymers, especially polymethyl methacrylate.

In U.S. Pat. No. 4,114,597, solar collectors are described which consist of triple-ribbed plates in which the hollow chamber layer facing the sun is filled with air and the hollow chamber layer turned away from the sun is filled with a heat-transfer medium which absorbs the solar energy. The triple-ribbed plates consist preferably of polymethyl methacrylate plastic due to its high transparency and resistance to weathering.

DE-OS 3,147,113 includes double-ribbed plates which contain illuminants located in the hollow chambers and which consist of break- and impact-resistant plastics which are not specified in more detail. The demand for break resistance and impact resistance is based on the application of the double-ribbed plates as floors or wall elements.

Polymethyl methacrylate is known to be a comparatively brittle plastic, sensitive to impact, which causes a reduced mechanical loadability of multiribbed plates made from polymethyl methacrylate plastic. In DE-OS 3,011,905 and U.S. Pat. No. 4,114,597, the use of impact-resistant, modified polymethyl methacrylate plastics as "material" for multiribbed plates is vaguely suggested (DE-OS 3,011,905, page 20, lines 35–37; U.S. Pat. No. 4,114,597, column 4, lines 34–40), but no data on the chemical composition and mechanical properties as well as on the minimum requirements in mechanical properties of such modified polymethyl methacrylate plastics is given.

EP-A 0,105,159 and EP-A 0,118,683 are also concerned with the problem of brittleness in multiribbed plates or polymethyl methacrylate plastics.

EP-A 0,105,159 describes multiribbed plates having parallel, flat outer layers of polymethyl methacrylate, with at least one middle layer. The plates have ribs in which the outer layers and the middle layer are connected with one another as one piece. The middle layer is constructed of a plastic with increased toughness and/or elevated zero shear-rate viscosity in the molten state, compared to the polymethyl methacrylate plastic. Due to the middle layer, the toughness of the multiribbed plate is increased, and especially, sagging of the middle layer during extrusion of the total compound is avoided or reduced.

In EP-A 0,118,683, multilayer, coextruded double-ribbed plates with reduced sensitivity to impact are disclosed. The plates contain two essentially flat outer walls with ribs connecting them as one piece. More than half of the entire thickness of the supporting layer of the outer wall consists of an acrylic glass, especially of polymethyl methacrylate plastic, and the inner side of the acrylic glass layer consists of a thinner inner layer combined adhesively with a plastic having a higher elongation at break, such as polycarbonate.

Both in EP-A 0,105,159 as well as in EP-A 0,118,683, the use of impact-resistant, modified polymethyl methacrylate plastic (EP-A 0,105,159, page 2, lines 21 and 22; EP-A 0,118,683, page 4, lines 10ff) is mentioned. Nevertheless, the method of production of the double-ribbed plates described there is associated with high equipment outlay. Furthermore, the tough plastics used in EP-A 0,105,159 and in EP-A 0,118,683 to reduce sensitivity to impact, such as, polycarbonates, polyesters, or polysulfones, are to a large extend detrimentally affected by weather, especially UV radiation, and must be stabilized accordingly.

SUMMARY OF THE PRESENT INVENTION

Accordingly, one object of the present invention is to provide a transparent multiribbed plate of polymethyl methacrylate which combines the advantages of high resistance to weathering and translucency with the advantage of high breaking resistance, especially in stress through hail.

A further object of the present invention is to provide a simple method for preparing such multiribbed polymethyl methacrylate plates.

These and other objects of the present invention have been satisfied by the discovery of a multiribbed plate consisting essentially of an impact-resistant polymethyl methacrylate SP, wherein the impact-resistant polymethyl methacrylate SP consists of:

p1) 4–30 wt % of an elastomer phase E of crosslinked polymer particles VP, consisting of 60–99.9 parts by weight alkyl acrylate, aryl acrylate or a mixture thereof, 0.1–10 parts by weight of one or more crosslinking agents, and 0–30 parts by weight of one or more monofunctional ethylenically unsaturated comonomers; and p2) 70–96 wt % of a thermoplastic matrix phase M of polymethyl methacrylate P, containing from 0 to 20 parts by weight, relative to 100 parts by weight P, of units from one or more comonomers, wherein the elastomer phase E and the matrix phase M have refraction indices which are the same or which deviate from one another by a value n, wherein $n \leq 0.02$, and the sum of p1) and p2) is 100 wt %, and wherein the multiribbed plate has specific geometric requirements to provide the desired properties.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
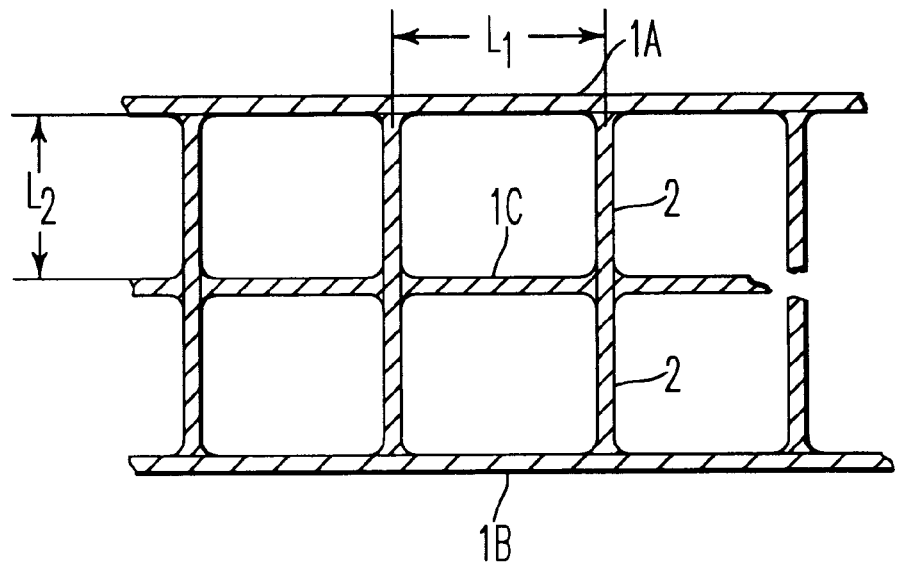
FIG. 1 shows a triple ribbed plate construction having outer flanges (1a) and (1b), middle flange (1c), ribs (2), a distance between ribs (2) of $L_1$, and a distance between adjacent flanges of $L_2$.

The present invention relate to a multiribbed plate consisting of an impact-resistant polymethyl methacrylate SP consisting essentially of:

p1) 4–30 wt % of an elastomer phase E consisting of crosslinked polymer particles VP, consisting of 60–99.9 parts by weight alkyl acrylate, aryl acrylate or a mixture thereof, 0.1–10 parts by weight of one or more crosslinking agents and 0–30 parts by weight of one ore more monofunctional ethylenically unsaturated monomers, and p2) 70–96 wt % of a thermoplastic matrix phase M of polymethyl methacrylate P, which contains from 0 to 20 parts by weight, relative to 100 parts by weight of p, of units from one or more comonomers, wherein the elastomer phase E and the matrix phase M have refractive indices which are the same or deviate from one another by a value n, where $n \leq 0.02$, and the sum of p1) and p2) is 100 wt %. In addition to the specific selection of the impact resistant polymethyl methacrylate SP, the following geometric criterion is required in the multiribbed plate of the present invention: the outer flanges (1a) lying on the weather-exposed side of the multiribbed plate must have a thickness d, which satisfies the following relationship:

$$d \text{ (mm)} \geq \frac{100 \, (\text{mm} \times \text{kJm}^{-2})}{a_{cU} \, (\text{kJm}^{-2}) + 30 \, (\text{kJm}^{-2})}, \quad (I)$$

wherein d is the thickness of the outer flange (1a) in mm and $a_{cU}$ is the Charpy impact resistance in $\text{kJm}^{-2}$ of the impact-resistant polymethyl methacrylate SP according to ISO 179/1fU.

With impact resistances of 70–80 $\text{kJm}^{-2}$, testing usually results in no fracture of the material. In such cases, a value of 80 $\text{kJm}^{-2}$ is to be used for $a_{cU}$ in the above equation.

Preferably, the outer flanges (1a) have a minimum thickness of $d_{mm}$ of 1.3 mm, with an impact resistance $a_{cU}$ of at least 50 $\text{kJm}^{-2}$. The hail resistance H 20 of such plates is at least 2 J, preferably at least 5 J (for determination of hail resistance, see Examples below).

The Impact-resistant Polymethyl Methacrylate SP

The impact-resistant polymethyl methacrylate SP of the present invention is constructed of p1) 4–30 wt % of an elastomer phase E and of p2) 70–96 wt % of a thermoplastic matrix phase M of polymethyl methacrylate P which contains from 0 to 20 parts by weight, relative to 100 parts by weight P, of units from one or more comonomers. The elastomer phase E and the matrix phase M have refractive indices which are the same or deviate from one another by a value n, wherein $n \leq 0.02$. The sum of p1)+p2) is 100 wt %.

The elastomer phase E of crosslinked polymer particles VP is made of 60–99.9 parts by weight of units from alkyl acrylate, aryl acrylate or a mixture thereof, of 0.1–10 parts by weight of one or more suitable crosslinkers and, optionally, of 0–30 parts by weight of one or more monofunctional ethylenically unsaturated monomers.

Preferably, the alkyl acrylates are $C_2$–$C_{10}$ alkyl acrylates such as ethyl, acrylate, propyl, acrylate, isopropyl acrylate, butyl acrylate, amyl acrylate, hexyl acrylate, 2-ethylhexyl acrylate, octyl acrylate, decyl acrylate, with butyl acrylate and 2-ethylhexyl acrylate being most preferred. Preferred aryl acrylates include phenyl acrylate, benzyl acrylate, 2-phenylethyl acrylate, 3-phenyl-1-propyl acrylate, 2-phenoxyethyl acrylate, 2-phenoxyethoxyethyl acrylate, with benzyl acrylate being most preferred.

The crosslinkers useful in the present invention are generally compounds with at least one ethylenically unsaturated, radially polymerizable groups. Suitable crosslinkers include: (meth)acrylic diesters of diols, such as ethylene glycol di(meth)acrylate or 1,4-butanedioldi(meth)acrylate, aromatic compounds, such as divinylbenzene, and compounds with at least one allyl group, such as allyl(meth)acrylate. Suitable crosslinkers having three or more ethylenically unsaturated, radially polymerizable groups include triallylcyanurate, trimethylolpropane tri(meth)acrylate and pentaerythritoltetra(meth)acrylate. Other examples of suitable crosslinkers are given, for example, in U.S. Pat. No. 4,513,118, the relevant portion of which is hereby incorporated by reference.

The optional one or more comonomers contained in the elastomer phase E serve primarily to adjust the generally low refractive index of the elastomer phase E to that of the matrix phase M. Therefore, comonomers having comparatively high refractive indices are preferably selected, such as radially polymerizable aromatic compounds. Suitable comonomers include: vinyltoluene, styrene, or α-methylstyrene, which are used in quantities such that they do not impair the weather resistance of the impact-resistant polymethyl methacrylate SP. These comonomers, when present, can be used alone or in combinations of two or more.

The matrix phase M, of which at least 5 wt % is connected covalently with the elastomer phase E, consists of a polymethyl methacrylate P which is constructed of 80–100 parts by weight of units from methyl methacrylate and preferably has a glass transition temperature of at least 70° C. Furthermore, in the polymethyl methacrylate P, 0–20 parts by weight of units from one or more ethylenically unsaturated, radically co-polymerizable comonomers may be present, preferably $C_1$–$C_4$-alkyl(meth)acrylates. The weight average molecular weight, $M_w$, of the polymethyl methacrylate is between $10^4$ to $10^6$, preferably between $3 \times 10^4$ and $5 \times 10^5$ d (to determine $M_w$, see H. F. Mark et al., *Encyclopedia of Polymer Science and Engineering*, 2nd Ed., Vol. 10, pages 1 ff, J. Wiley and Sons, New York, 1989).

Preferably, the elastomer phase E is a component of two- or more-step emulsion polymer EP, which consists in an outer shell of the polymethyl methacrylate P which forms the matrix phase M. Especially preferred are emulsion polymers EP with at least a three-step construction, formed of a core K of polymethyl methacrylate P, a first shell S1 of the elastomer phase E, and a second shell S2 of polymethyl methacrylate P, wherein additional shells may be connected alternately corresponding to shells S1 and S2. The portion of emulsion polymer EP in impact-resistant polymethyl methacrylate SP is between 5–70 wt % relative to SP, preferably between 10–50 wt % relative to SP, wherein the remaining weight portions are made up by the polymethyl methacrylate plastic P not contained in the latex particles.

Preferably, the impact-resistant polymethyl methacrylate SP is produced by mixing emulsion polymer EP with polymethyl methacrylate P. For example, emulsion EP and P are mixed and then the aqueous phase and the emulsifiers are separated. Alternatively, the emulsion polymer EP is first isolated from the aqueous phase and then mixed with polymethyl methacrylate, produced, for example, by continuous polymerization, in the molten mass. In all, the latex particles which form emulsion polymer EP should have a diameter between 0.1–3 μm, preferably between 0.15–1 μm. In principle, the construction of such latex particles and isolation of the emulsion polymer EP for two-step emulsion polymers EP is described in European Patent No. 0,033,999 (=U.S. Pat. No. 4,543,383), and for three-step emulsion polymers EP in European Patent No. 0,113,924 (=U.S. Pat. No. 4,513,118). The relevant portions of each of U.S. Pat. Nos. 4,543,383 and 4,513,118 are hereby incorporated by reference. In the aqueous emulsion polymerization, it is expedient to work in the neutral or slightly acid pH range, whereby the use of long-chain alkyl sulfates or alkylsulfonates as emulsifiers is preferred. Suitable polymerization initiators include conventional azo compounds or organic or inorganic peroxides, such as persulfates which are generally used in quantities between $10^{-3}$ and 1 wt % relative to the monomers. To adjust the weight average molecular weight $M_w$ of the polymethyl methacrylate present in the emulsion polymer, any conventional molecular weight regulators can be used. Examples of such molecular weight regulation include mercapto compounds such as 2-ethylhexylthioglycolate or tert-dodecylmercaptan.

Multiribbed Plates

The multiribbed plates according to the present invention are preferably designed as triple-ribbed plates (FIG. 1) and, as double-ribbed plates (FIG. 2), most preferably double ribbed plates, and are constructed essentially of impact-resistant polymethyl methacrylate SP.

In DE-A 2,754,649, conventional triple-ribbed plates (FIG. 1) are described whose ribs (2) are arranged in straight lines throughout between the outer walls, having middle flange (1c) which are at most 3/5 of the thickness of the outer flanges (1a) and (1b), and whose entire thickness is at least 25 mm.

Figure 2:
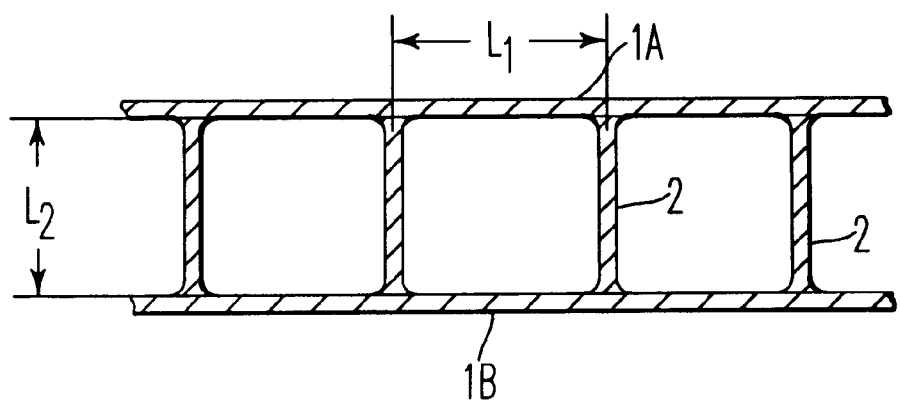
FIG. 2 shows a double ribbed plate construction having outer flanges (1a) and (1b), ribs (2), a distance between ribs (2) of $L_1$, and a distance between adjacent flanges of $L_2$.

In FIG. 2, a double-ribbed plate is represented whose outer walls are connected through ribs (2), as described, for example, in DE-Gbm 8,302,430. The connecting pieces between two ribs, forming the outer walls of the double-ribbed plate are identified as outer flanges (1a) and (1b). In the triple-ribbed plate of FIG. 1, aside from this, there are also middle flanges (1c), which additionally stabilize the ribbed plate.

In the plates of the present invention, the outer flange (1a) lying on the side of the multiribbed plate exposed to weathering, has a thickness d which satisfies the following relationship:

$$d\,(\text{mm}) \geq \frac{100\,(\text{mm} \times \text{kJm}^{-2})}{a_{cU}\,(\text{kJm}^{-2}) + 30\,(\text{kJm}^{-2})}, \qquad (\text{I})$$

where d is the thickness of the outer flange (1a) in mm and $a_{cU}$ is the Charpy impact resistance in kJm$^{-2}$ of impact-resistant polymethyl methacrylate SP according to ISO 179/1fU.

The minimum thickness $d_{min}$ of the outer flanges (1a) is preferably 1.3 mm, with the impact resistance $a_{cU}$ at $d_{min}$ preferably being at least 50 kJm$^{-2}$.

The production of the multiribbed plates is readily performed with a suitable extrusion installation, such as the one described in EP-A 453,078 for double-ribbed plates, which includes an extrusion nozzle having two slits formed by lips running straight and parallel over the width of the extrusion nozzle, for the extrusion of two parallel, even outer walls of the double-ribbed plate. The extrusion nozzle further has a core piece which is mounted between the slits and is cut into a number of cross slits which open into the slits and serve for extrusion of the ribs (2), which connect the outer walls of the extruded double-ribbed plate with one another. In each case, one of the two lips which form the slits is designed to be flexible, and the flexible lips can be repositioned through a number of independent positioning elements.

EP-A 484,721 also includes a device for the production of double-ribbed plates consisting of two even outer walls and the ribs connecting them, containing (i) extrusion nozzles for the production of flat lines which form the outer walls of the hollow chamber plate, (ii) intermediary supports movable in the discharge direction to take up the thermoplastic lines, (iii) means for combining the lines with the ribs, (iv) means for tempering the intermediary supports and (v) means for separation of the intermediary supports from the cooled double-ribbed plate strand. A particular feature of the device is that it contains extrusion nozzles for the production of strands for the formation of the ribs which connect the outer walls, which are arranged so that the edges of the exiting molten strands come into contact with the lines adhering to the intermediary supports.

Triple-ribbed plates can, in principle, be produced analogously to the methods described above, and can be used for the production of double-ribbed plates. An extrusion tool suitable for the production of triple-ribbed plates is described in EP-A 105,159. Such as extrusion tool is used to prepare triple ribbed plates according to the present invention as follows: the impact-resistant methyl methacrylate SP, melted in the extruder, is pressed through a mass channel into a distribution channel. It flows from there into the channel which form the outer flanges (1a) and (1b) of the triple-ribbed plate (FIG. 1), and also into slits between the core pieces of the extrusion nozzles, whereby ribs (2) are formed. The core pieces are mounted on a beam in which a distribution channel flows. In the latter, molten, impact-resistant polymethyl methacrylate SP (which may come from the same previously mentioned extruder), is fed for the formation of the middle flanges (1c) and is pressed through the channels into each individual core piece. The channels broaden in compartments in the direction towards the nozzle mouth and there occupy the total breadth of the core pieces so that the flows of impact-resistant polymethyl methacrylate SP which come through unite with the flows of SP which flow in the rib-forming slits.

The multiribbed plates according to the present invention may, furthermore, have functional layers on the outer and/or inner sides of the hollow chambers, such as strengtheners, anti-reflex coatings, IR-reflective coatings, and dirt-repellent or water-repellent coatings. Coating with UV-absorbing layers is relevant for the reduction of the permeability of the multiribbed plates to UV light, but does not, or only in a very limited fashion, provide for the protection of the multiribbed plates themselves.

Such functional layers on the outer and/or inner sides of the hollow chamber of the multiribbed plates can be applied by conventional methods, such as coextrusion, dip coating, blade application, brush application, or reverse roll coating.

The multiribbed plate according to the present invention combines a number of advantages:

high mechanical resistance, especially high resistances to hail in use as a vitrification element, high resistance to weathering, especially against UV radiation from sunlight without repairing additional protective measures against UV light, high translucency, especially for daylight and UV-A radiation when used as a vitrification element, especially in greenhouses, and good heat insulation due to the air enclosed in the hollow chambers, when used as large-surface vitrification elements.

Having generally described this invention, a further understanding can be obtained by reference to certain specific examples which are provided herein for purposes of illustration only and are not intended to be limiting unless otherwise specified.

EXAMPLES

The polymers used for the production of the ribbed plates were:

1. Impact-resistant Polymethyl Methacrylate (SA-PMMA)

As a base for the mixtures of Examples 1 and 2 and Comparative Example 1, the following was used:

Impact-resistant, modified polymethyl methacrylate, PLEXIGLAS® Y7H of Röhm GmbH containing 15 wt % of polybutyl acrylate, obtained by mixing 64 wt % of polymethyl methacrylate PLEXIGLAS® Y7H with 36 wt % of a core-shell-emulsion polymer, EP1, having a composition of 20 parts by weight of a crosslinked polymethyl methacrylate core; 44 parts by weight of crosslinked polybutyl acrylate-costyrene, having the same refractive index as polymethyl methacrylate, as the first shell, and 36 parts by weight of polymethyl methacrylate as the second shell (the production of EP 1 is described in EP-A 113,924).

2. Standard Polymethyl Methacrylate

As mixing components and as materials for the production of the ribbed plate, the following were used in Comparative Example 2: PLEXIGLAS Formmasse® Y7H of Röhm GmbH.

Production of the Ribbed Plates (SDP 10–32)

The ribbed plates were produced using the procedure according to EP-A 453,078, described above. The distance between the flanges, $L_2$, was 10 mm, and the distance between the ribs, $L_1$, was 32 mm. The thickness of the upper flange varied from 1–4 mm. Ribs and lower flange were 1–1.5 mm thick.

Testing for Resistance to Hail

A compressed-air-operated hail cannon with a measured value recorder for the flying time of the pellets was used. The hail cannon shot polyamide pellets of 20 mm in diameter at vertically stretched plates, supplying energies at impact of 0.2–30 J. This procedure simulates natural hail quite well. Natural hail has an impingement energy which only very seldom exceeds 2 J (corresponding to a core diameter of approximately 22 mm).

The samples were built into a holding device having an original width of 1200 mm. No preconditioning was performed.

The samples were attached to the shooting wall with the cannons pushed back. Here, care was taken that the sample was built-in as much as possible and was free of bending tension, in order to avoid stretching effects.

The required air pressure was adjusted on the pressure-decreasing device of the compressed air bottle. To load the cannon, the interlocking bar was opened by pressing a button, and the corresponding pellet was loaded. After the blast, the impact site of the pellet was evaluated.

The hail resistance, H 20, is the lowest measured energy in Joules (J) which still causes fracturing of the sample.

Example 1

Ribbed Plate According to the Present Invention

The ribbed plate was extruded as described above from a mixture of 60% of the impact-resistant polymethyl methacrylate, SZ-PMMA, and 40% PLEXIGLAS Formmasse® Y7H. The impact resistance of this mixture was $a_{cU}$=55 kJm$^{-2}$ (ISO 179/1fU). A minimum thickness of the upper flange (=flange exposed to the hail) of 1.2 mm resulted from formula (I) for this impact resistance.

The thickness of the upper flange of the example plate was 1.5 mm. The determined hail resistance H 20 was 8 J.

Example 2

Ribbed Plate According to the Invention

For the production of the ribbed plate, a mixture of 80% of the impact-resistant polymethyl methacrylate, SZ-PMMA, and 20% PLEXIGLAS Formmasse® Y7H was used. The testing of impact resistance yielded "no fracture."

Consequently, $a_{cU}$=80 was used in the formula of the principal claim. This gave d≧0.9 mm. The example ribbed plate had an upper flange thickness of 1.1 mm. The hail resistance was H 20=10 J.

Comparative Example 1

The ribbed plate was extruded as in Example 1 to give an upper flange thickness of only 0.8 mm. This thickness was less than the minimum thickness of 1.2 mm calculated in Example 1. The hail resistance was H 20=1.9 J and thus, was under the limiting value of 2 J, and far below the preferred value of 5 J.

Comparative Example 2

The ribbed plate was extruded from standard PMMA (PLEXIGLAS Formmasse® Y7H) without addition of an impact resistance modifier. The impact resistance of the standard PMMA was 15 kJm$^{-2}$. According to formula (I), the minimum thickness of the upper flange would be required to be 2.2 mm. Even though the ribbed plate of the example had an upper flange thickness of 3.7 mm (well above the calculated minimum), the hall resistance was still only 0.8 J.

This application is based on German Utility Model No. 295 04 997.9, filed with the German Patent Office on Mar. 24, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent multiribbed plate consisting essentially of an impact-resistant polymethyl methacrylate SP, wherein SP consists of:

p1) 4–30 wt % of an elastomer phase E of crosslinked polymer particles, consisting of 60–99.9 parts by weight of an alkyl acrylate, an aryl acrylate or a mixture thereof, 0.1–10 parts by weight of one or more crosslinking agents containing at least two radially polymerizable ethylenically unsaturated groups, and 0–30 parts by weight of one or more monofunctional ethylenically unsaturated comonomers selected from the group consisting of vinyltoluene, styrene, and α-methylstyrene; and p2) 70–96 wt % of a polymethyl methacrylate P, containing from 0 to 20 parts by weight, relative to 100 parts by weight P, of units from one or more comonomers, wherein the elastomer phase E is a component of an emulsion polymer EP having at least a three-component particle construction, formed from a core K of polymethyl methacrylate P, a first shell S1 of the elastomer phase E, and a second shell S2 of polymethyl methacrylate P which forms part of a matrix phase M, wherein the elastomer phase E and the matrix phase M have refraction indices which are substantially the same, and the sum of p1) and p2) is 100 wt %, wherein the multiribbed plate has outer flanges (1a) and (1b) connected by ribs, optionally containing a middle flange positioned between the outer flanges and at a distance from each outer flange and wherein said middle flange is connected to each outer flange by said ribs, wherein the outer flange (1a) is on a side of the multiribbed plate exposed to weather during use and must have a thickness d, which satisfies the following relationship:

$$d\,(\text{mm}) \geq \frac{100\,(\text{mm} \times \text{kJm}^{-2})}{a_{cU}\,(\text{kJm}^{-2}) + 30\,(\text{kJm}^{-2})}, \quad \text{(I)}$$

wherein d is the thickness of the outer flange (1a) in mm and $a_{cU}$ the Charpy impact resistance in kJm$^{-2}$ of impact-resistant polymethyl methacrylate SP according to ISO 179/1fU, with the proviso that d is no more than 125% of its minimum value according to formula (I).

2. The multiribbed plate according to claim 1, wherein the emulsion polymer EP contains additional shells connected to the particle alternating in composition between the compositions of shells S1 and S2.

3. The multiribbed plate according to claim 1, wherein the external flange (1a) has a minimum thickness $d_{min\,of}$ 1.5 mm.

4. The multiribbed plate according to claim 1, wherein the 60–99.9 parts by weight of alkyl acrylate, aryl acrylate or a mixture thereof is at least one member selected from the group consisting of $C_2$–$C_{10}$ alkyl acrylates, phenyl acrylate, benzyl acrylate, 2-phenylethyl acrylate, 3-phenyl-1-propyl acrylate, 2-phenoxyethyl acrylate, and 2-phenoxyethoxyethyl acrylate.

5. The multiribbed plate according to claim 4, wherein said $C_2$–$C_{10}$ alkyl acrylate is a member selected from the group consisting of ethyl acrylate, propyl acrylate, isopropyl acrylate, butyl acrylate, amyl acrylate, hexyl acrylate, 2-ethylhexyl acrylate, octyl acrylate and decyl acrylate.

6. The multiribbed plate according to claim 5, wherein said $C_2$–$C_{10}$ alkyl acrylate is butyl acrylate or 2-ethylhexyl acrylate.

7. The multiribbed plate according to claim 1, wherein said polymethyl methacrylate P has a glass transition temperature of at least 70° C.

8. The multiribbed plate according to claim 1, wherein said polymethyl methacrylate P has a weight average molecular weight of from $10^4$ to $10^6$.

9. The multiribbed plate according to claim 1, wherein the emulsion polymer EP is present in the impact-resistant polymethyl methacrylate SP in an amount of from 10 to 30 wt %, based on the amount of SP.

10. The multiribbed plate according to claim 1, wherein the emulsion polymer EP is in the form of latex particles having a particle diameter of from 0.1 to 3 µm.

11. A heat-insulating material comprising one or more multiribbed plates as claimed in claim 1.

* * * * *

UNITED STATES PATENT AND TRADEMARK OFFICE
CERTIFICATE OF CORRECTION

PATENT NO. : 6,110,561
DATED : August 29, 2000
INVENTOR(S) : Volker Benz et al.

It is certified that error appears in the above-identified patent and that said Letters Patent is hereby corrected as shown below:

Column 3,
Line 67, "propyl, acrylate," should read -- propyl acrylate, --.

Column 4,
Line 9, "one ethylenically" should read -- two ethylenically --.

Column 6,
Line 34, "channel which" should read -- channels which --;
Line 63, "high resistances" should read -- high resistance --.

Column 7,
Line 18, "Methacrylate (SA-" should read -- Methacrylate (SZ- --;
Line 35, "Y7H of R" should read -- Y7H of --;
Line 36, "öhm GmbH." should read -- Röhm GmbH. --.

Column 8,
Line 47, "the hall resistance" should read -- the hail resistance --.

Column 10,
Line 6, "thickness $d_{min \, of}$ 1.5 mm." should read -- thickness $d_{min}$ of 1.5 mm. --.

Signed and Sealed this

Eleventh Day of December, 2001

Attest:

NICHOLAS P. GODICI
Attesting Officer    Acting Director of the United States Patent and Trademark Office